(12) United States Patent
Williams et al.

(10) Patent No.: US 10,286,906 B2
(45) Date of Patent: May 14, 2019

(54) VEHICLE SAFETY SYSTEM

(71) Applicants: DENSO International America, Inc., Southfield, MI (US); DENSO CORPORATION, Kariya-shi, Aichi-ken (JP)

(72) Inventors: Matthew Williams, Royal Oak, MI (US); Bo Sun, Farmington Hills, MI (US)

(73) Assignees: DENSO International America, Inc., Southfield, MI (US); DENSO CORPORATION, Kariya, Aichi-pref. (JP)

( * ) Notice: Subject to any disclaimer, the term of this patent is extended or adjusted under 35 U.S.C. 154(b) by 152 days.

(21) Appl. No.: 15/413,578

(22) Filed: Jan. 24, 2017

(65) Prior Publication Data

US 2018/0208188 A1    Jul. 26, 2018

(51) Int. Cl.
| | |
|---|---|
| *B60W 30/09* | (2012.01) |
| *G08G 1/0965* | (2006.01) |
| *B60R 11/04* | (2006.01) |
| *B60T 7/22* | (2006.01) |
| *B60T 8/17* | (2006.01) |
| *G08G 1/16* | (2006.01) |
| *H04W 84/00* | (2009.01) |
| *H04L 29/08* | (2006.01) |

(52) U.S. Cl.
CPC .............. *B60W 30/09* (2013.01); *B60R 11/04* (2013.01); *B60T 7/22* (2013.01); *B60T 8/17* (2013.01); *G08G 1/0965* (2013.01); *G08G 1/162* (2013.01); *H04L 67/12* (2013.01); *H04W 84/00* (2013.01); *B60T 2201/02* (2013.01); *B60T 2210/32* (2013.01); *B60T 2260/02* (2013.01); *H04W 84/005* (2013.01)

(58) Field of Classification Search
CPC ...... B60W 30/09; B60R 11/04; G08G 1/0965; G08G 1/161; B60T 7/12; B60T 2260/02; B60T 2201/02

See application file for complete search history.

(56) References Cited

U.S. PATENT DOCUMENTS

| | | | |
|---|---|---|---|
| 3,638,179 A | 1/1972 | Coll et al. | |
| 4,048,613 A * | 9/1977 | Ito | G01S 13/931 180/169 |
| 5,495,242 A * | 2/1996 | Kick | B60Q 9/008 340/902 |
| 6,056,374 A | 5/2000 | Hiwatashi | |
| 6,252,519 B1 | 6/2001 | McKenna | |

(Continued)

FOREIGN PATENT DOCUMENTS

| | | |
|---|---|---|
| JP | S57-194198 U | 12/1982 |
| JP | 2008-151532 A | 7/2008 |

(Continued)

OTHER PUBLICATIONS

Baldwin et al., U.S. Appl. No. 62/112,786, filed Feb. 6, 2015. (Year: 2015).*

*Primary Examiner* — Mary Cheung
(74) *Attorney, Agent, or Firm* — Harness, Dickey & Pierce, P.L.C.

(57) ABSTRACT

Systems and methods for slowing (and stopping) a subject vehicle in response to detection of an emergency vehicle with activated emergency lights, or a school bus with activated stop lights.

17 Claims, 5 Drawing Sheets

(56) References Cited

U.S. PATENT DOCUMENTS

| | | | |
|---|---|---|---|
| 8,589,014 B2 | 11/2013 | Fairfield et al. | |
| 9,053,637 B2 | 6/2015 | Mawbey et al. | |
| 9,249,742 B2 | 2/2016 | Sangameswaran et al. | |
| 9,376,051 B1* | 6/2016 | McKenna | G08G 1/0965 |
| 2004/0155795 A1* | 8/2004 | Quintana | G08G 1/0965 |
| | | | 340/902 |
| 2009/0265069 A1* | 10/2009 | Desbrunes | B60T 7/22 |
| | | | 701/70 |
| 2012/0194353 A1* | 8/2012 | Groves | G08G 1/096716 |
| | | | 340/907 |
| 2014/0078291 A1* | 3/2014 | Hammarstrom | G08G 1/163 |
| | | | 348/118 |
| 2015/0364040 A1* | 12/2015 | Simon | B60R 25/24 |
| | | | 340/902 |
| 2016/0231746 A1* | 8/2016 | Hazelton | G05D 1/0257 |
| 2018/0012492 A1* | 1/2018 | Baldwin | B60T 7/00 |
| 2018/0178766 A1 | 6/2018 | Oba | |

FOREIGN PATENT DOCUMENTS

| | | |
|---|---|---|
| JP | 2014-154128 A | 8/2014 |
| WO | WO-2017/002471 A1 | 1/2017 |

* cited by examiner

VEHICLE SAFETY SYSTEM

FIELD

The present disclosure relates to a vehicle safety system, such as a vehicle safety system for assisting a subject vehicle with stopping for emergency vehicles and school buses.

BACKGROUND

This section provides background information related to the present disclosure, which is not necessarily prior art.

Systems that help drivers identify obstacles and avoid collisions are becoming increasingly popular. While current systems are suitable for their intended use, they are subject to improvement. For example, current systems fail to sufficiently address the legal requirement that a vehicle stop and yield to emergency vehicles (e.g., ambulances, police vehicles, and fire department vehicles), and stop for school buses picking up or dropping off students. The present teachings provide a vehicle safety system that addresses such shortcomings in the art, and provides numerous other advantages as well.

SUMMARY

This section provides a general summary of the disclosure, and is not a comprehensive disclosure of its full scope or all of its features. The present teachings advantageously provide for a system for slowing a subject vehicle in response to detection of an emergency vehicle with activated emergency lights, or a school bus with activated stop lights. Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
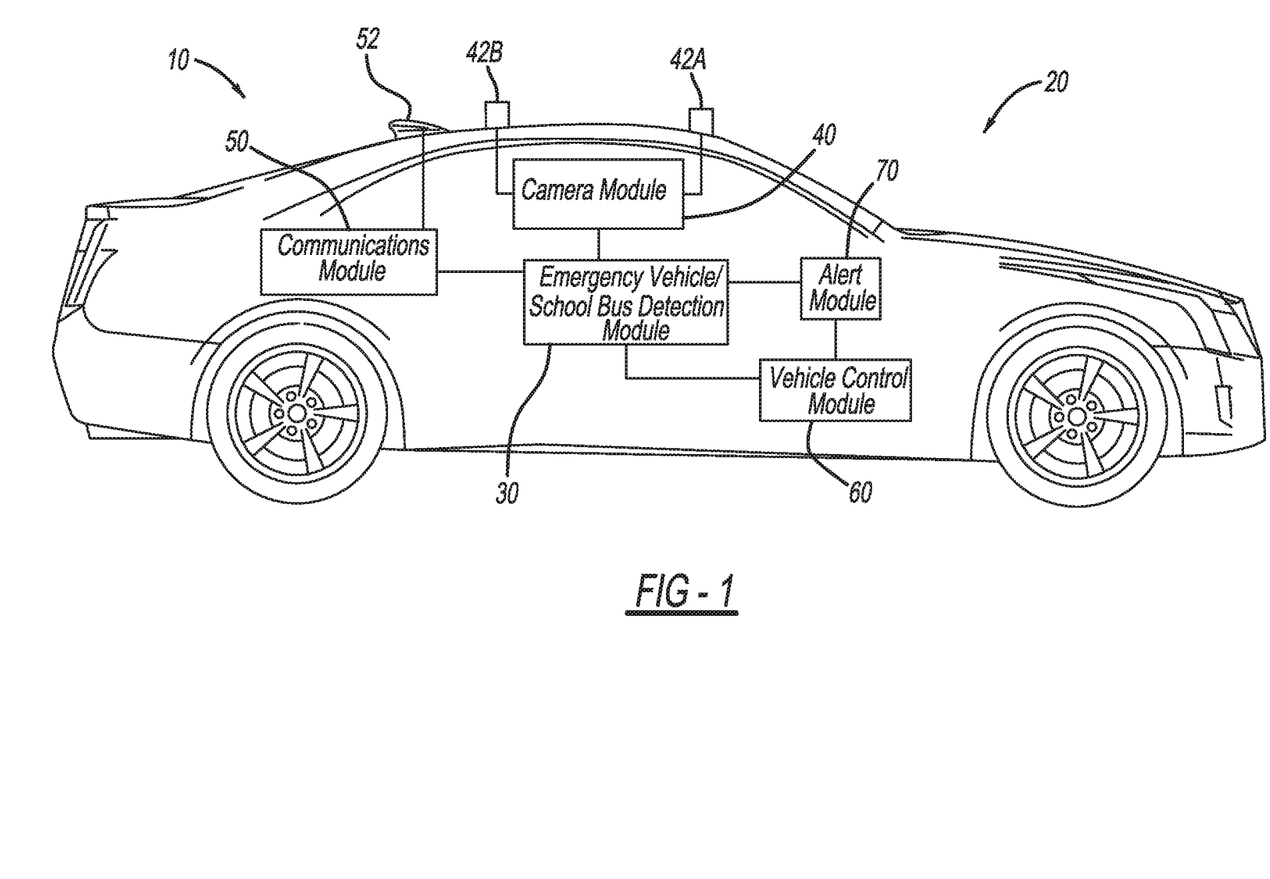
FIG. 1 illustrates a vehicle safety system according to the present teachings included with an exemplary subject vehicle.
Figure 2A:
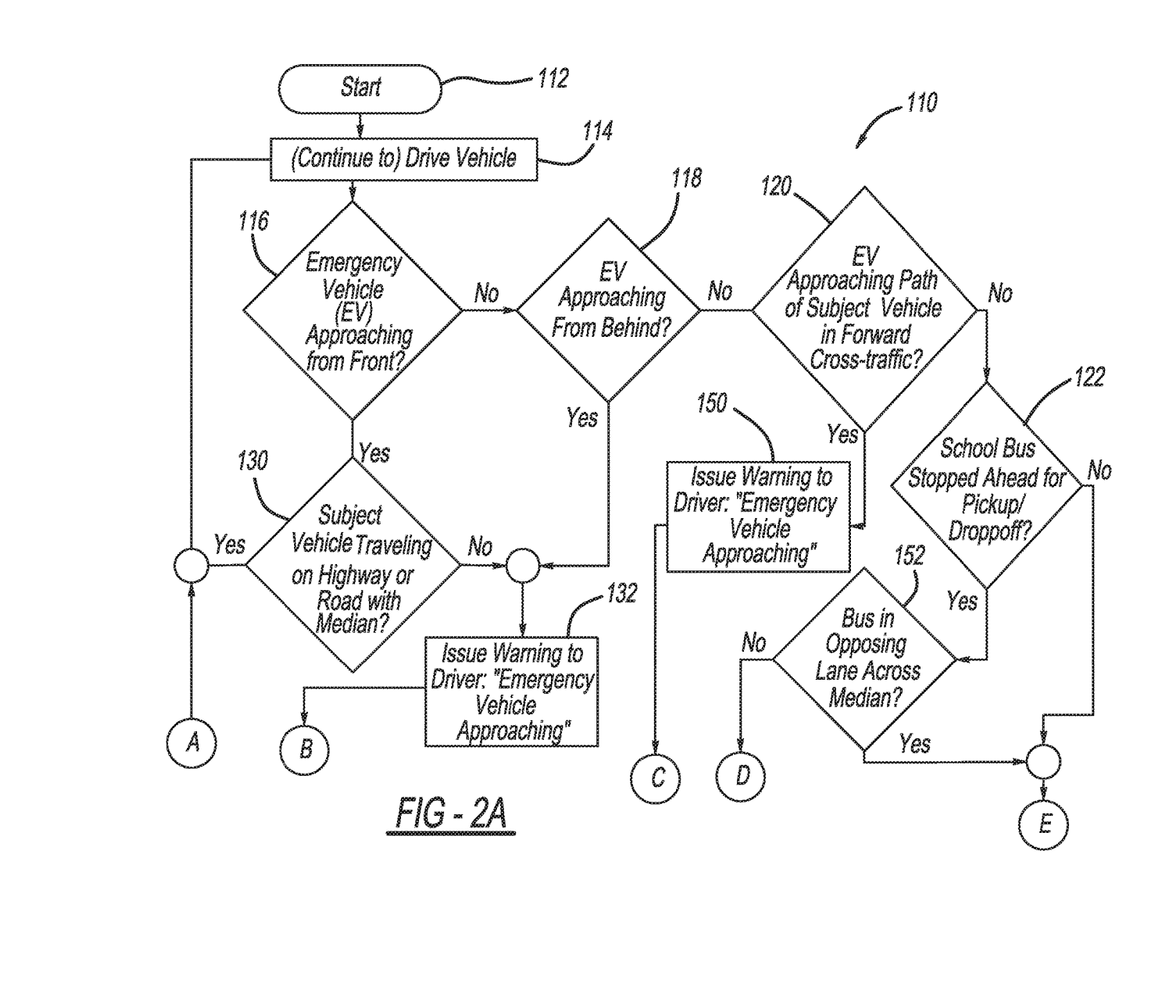
FIG. 2A illustrates a method according to the present teachings for slowing a subject vehicle upon detection of an emergency vehicle or school bus.
Figure 2B:
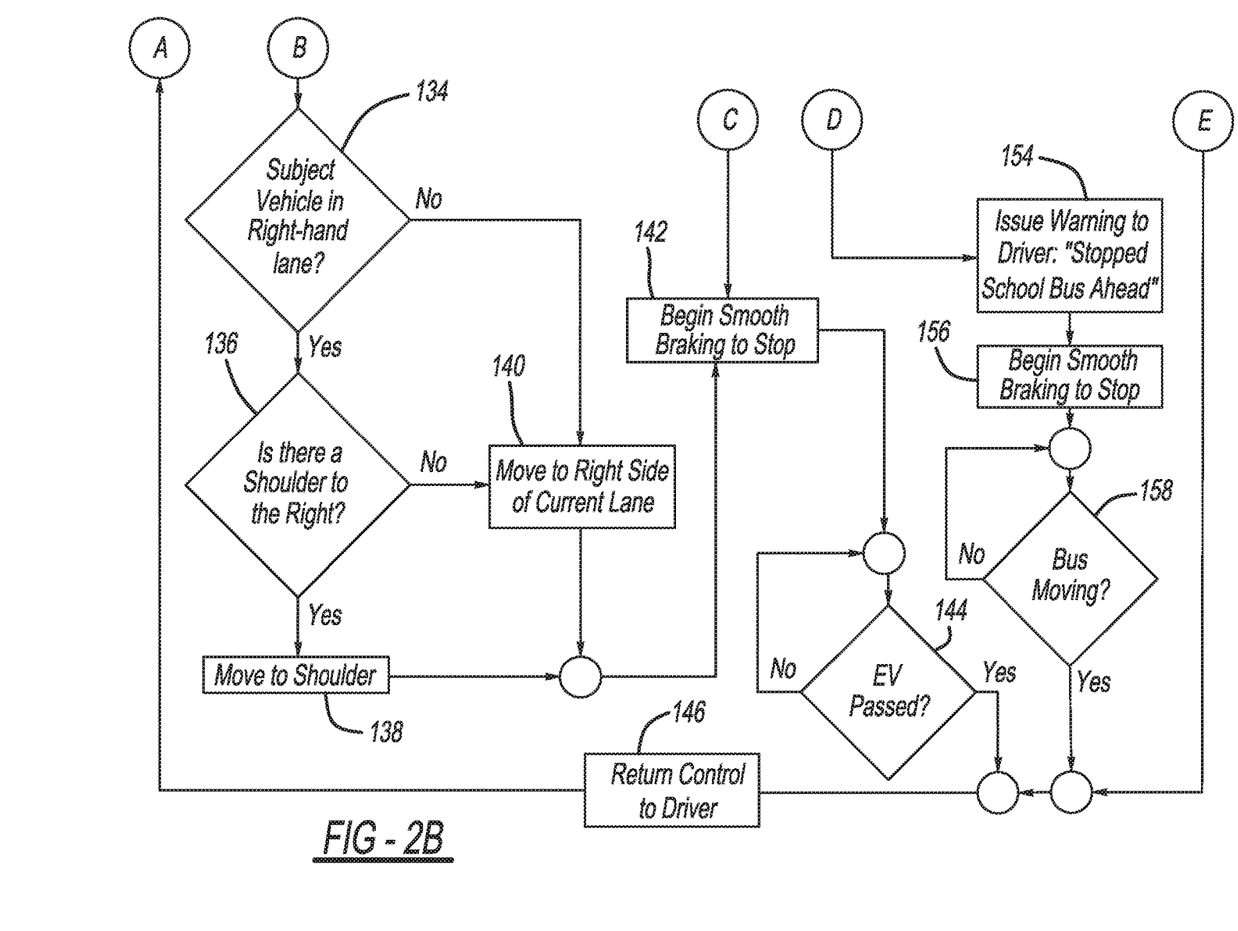
FIG. 2B is a continuation of the method of FIG. 2A.

With initial reference to FIG. 1, a vehicle safety system 10 in accordance with the present teachings is illustrated as installed in an exemplary vehicle 20. Although the vehicle 20 is illustrated as a passenger vehicle, the vehicle safety system 10 (and the method 110 of FIG. 2) according to the present teachings can be used with any other suitable vehicle, such as any suitable commercial vehicle, mass transit vehicle, military vehicle, recreational vehicle, all-terrain vehicle, motorcycle, construction equipment, personal transportation device, watercraft, aircraft, etc.

In this application, including the definitions below, the term "module" or the term "controller" may be replaced with the term "circuit." The term "module" may refer to, be part of, or include processor hardware (shared, dedicated, or group) that executes code and memory hardware (shared, dedicated, or group) that stores code executed by the processor hardware. The code is configured to provide the features of the modules, controllers, and systems described herein. The term memory hardware is a subset of the term computer-readable medium. The term computer-readable medium, as used herein, does not encompass transitory electrical or electromagnetic signals propagating through a medium (such as on a carrier wave). The term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

Figure 3A:
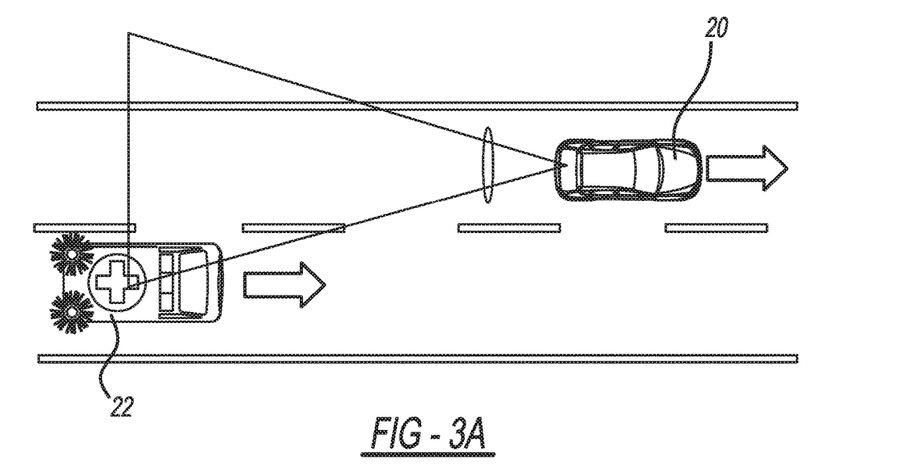
FIG. 3A illustrates detection of an emergency vehicle by a subject vehicle in accordance with the present teachings.
Figure 3B:
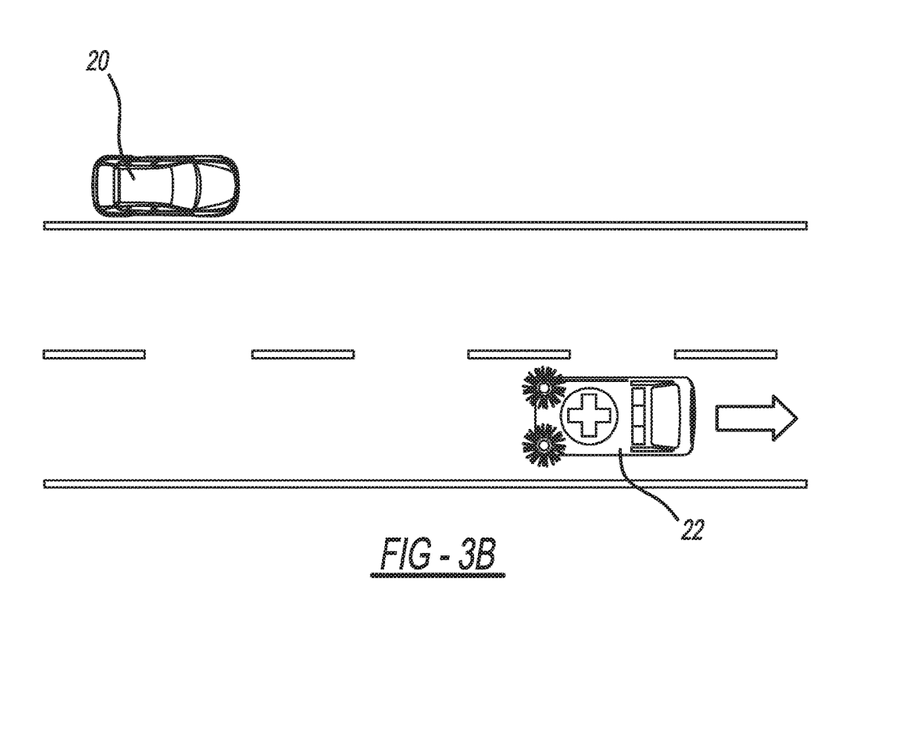
FIG. 3B illustrates slowing of a subject vehicle in response to detection of the emergency vehicle, in accordance with the present teachings.

The vehicle safety system 10 includes an emergency vehicle/school bus detection module 30. The emergency vehicle/school bus detection module 30 is configured to detect location of a school bus and/or any suitable emergency vehicle (e.g., ambulance, fire vehicle, police vehicle, etc.) relative to the subject vehicle 20. The emergency vehicle/school bus detection module 30 is also configured to detect whether or not emergency lights of an emergency vehicle have been activated and/or whether or not stop lights (and optionally a deployable stop sign) of a school bus have been activated. FIG. 3A illustrates an exemplary situation where subject vehicle 20 has detected an emergency vehicle 22 with emergency lights thereof activated. In FIG. 3B, the system 10 has slowed the subject vehicle 20 and moved the subject vehicle 20 to the shoulder, in accordance with the present teachings set forth herein.

The emergency vehicle/school bus detection module 40 is configured to detect the emergency vehicle with activated emergency lights and/or the school bus with activated stop lights in any suitable manner. For example, the vehicle safety system 10 can include a camera module 40 that receives data from cameras mounted about the subject vehicle 20, such as a forward camera 42A and/or a rearward camera 42B. The camera module 40 receives and processes image data gathered by the cameras 42A and 42B of the environment around the subject vehicle 20, and inputs the image data to the emergency vehicle/school bus detection module 30. The module 30 analyzes the image data to identify any emergency vehicles proximate to the subject vehicle 20, determines whether or not emergency lights thereof have been activated, and determines the location and distance of the emergency vehicle relative to the subject vehicle 20. The module 30 can be further configured to identify any school buses proximate to the subject vehicle 20, whether or not stoplights (and optionally a deployable stop sign) of a school bus have been activated, and the location and distance of the school bus relative to the subject vehicle 20.

The module 30 is further configured to determine the type of road that the subject vehicle 20 is traveling upon based on image data received from the camera module 40. For example, the module 30 can determine if the subject vehicle 20 is traveling on a two lane road, a highway, etc., whether the road has a median, and whether the road has a shoulder. The module 30 is also configured to determine the particular lane of the road that the subject vehicle 20 is traveling along.

Figure 4:
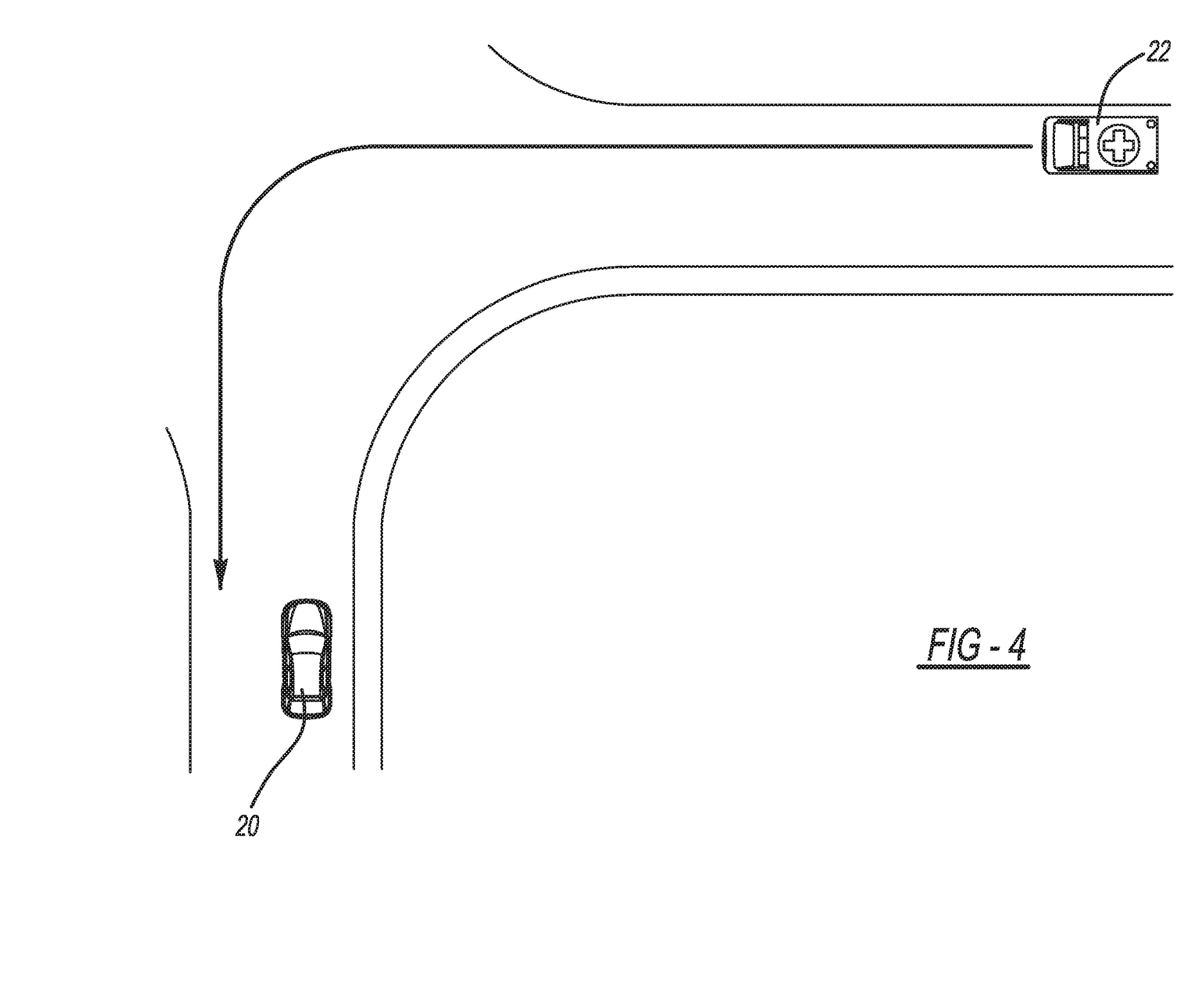
FIG. 4 illustrates detection of an emergency vehicle and its intended route using vehicle-to-vehicle communication in accordance with the present teachings.

The module 30 is also configured to detect emergency vehicles with activated emergency lights, school buses with activated stop lights, and the anticipated route of each based on data transmitted by the emergency vehicles and/or school buses through vehicle-to-vehicle communication. This advantageously allows the subject vehicle 20 to detect emergency vehicles and school buses that may be out of the field of view of the subject vehicle 20. FIG. 4 illustrates an exemplary situation where the subject vehicle 20 is able to detect the presence of emergency vehicle 22 with activated emergency lights, and the anticipated route of the emergency vehicle 22 to determine whether the subject vehicle 20 will need to stop and yield to the emergency vehicle 22. The location and route data broadcast by emergency vehicles and school buses is input to a communications module 50 of the vehicle safety system 10, and received at the subject vehicle 20 by vehicle antenna 52, which is connected to the communications module 50. The communications module 50 is configured to process the data, and transfer the data to the module 30. The vehicle-to-vehicle communication can be performed using any suitable communication standards and protocol.

The vehicle safety system 10 further includes a vehicle control module 60. The vehicle control module 60 is configured to reduce the speed of the subject vehicle 20, and bring the subject vehicle 20 to a complete stop, in any suitable manner. For example, the vehicle control module 60 is able to control braking of the subject vehicle 20 and/or downshift the subject vehicle 20 to slow and ultimately stop the subject vehicle 20. The vehicle control module 60 is further configured to control steering of the subject vehicle 20 in any suitable manner. For example, the vehicle control module 60 can control the steering angle of the tires and/or selectively brake different tires in order to control the direction of the subject vehicle 20. The vehicle control module 60 can steer the subject vehicle 20 to a shoulder of the road that the vehicle 20 is traveling upon (see FIG. 3B for example), or off to a side of a particular lane that the vehicle 20 is traveling in if the road has no shoulder, in order to yield to an emergency vehicle.

The vehicle control module 60 is in communication with the emergency vehicle/school bus detection module 30. When the module 30 detects that an emergency vehicle with activated emergency lights and the subject vehicle 20 are approaching one another, the module 30 will command the vehicle control module 60 to slow the subject vehicle 20 in a gradual, smooth, and safe manner (such as by applying 0.1 G of braking force) in order to yield to the emergency vehicle. The module 30 will also instruct the vehicle control module 60 to steer the subject vehicle 20 to the shoulder of the road if the shoulder is available (see FIG. 3B for example). If no shoulder is available, the module 30 will instruct the vehicle control module 60 to steer the subject vehicle 20 out of the way of the emergency vehicle in any suitable and safe manner, such as off to the side (the right side, for example) of the particular lane that the subject vehicle 20 is traveling in to allow the emergency vehicle to safely pass the subject vehicle 20.

If the module 30 detects that a school bus has stopped ahead of the subject vehicle 20, the module 30 will command the vehicle control module 60 to bring the subject vehicle 20 to a gradual, smooth, and safe stop (such as by applying 0.1 G of braking force). In some applications, the module 30 may be configured so as to not command the vehicle control module 60 to stop the subject vehicle 20 if the school bus is stopping in a lane carrying traffic in a direction opposite to the direction of travel of the lane that the subject vehicle 20 is in, and on a side of a median opposite to the subject vehicle 20. The module 30 can also be configured to control the subject vehicle 20 by way of the vehicle control module 60 such that the subject vehicle 20 complies with all local regulations regarding yielding to emergency vehicles and stopping for school buses.

The vehicle safety system 10 can further include an alert module 70. The alert module 70 includes any suitable device and/or system for alerting a driver of the subject vehicle 20 of the emergency vehicle with activated emergency lights, and the school bus with activated stop lights. For example, the alert module 70 can include a display displaying the position of the emergency vehicle and/or school bus relative to the subject vehicle 20, or any other suitable visual and/or audible alert sufficient to inform the driver of the emergency vehicle and/or school bus. The alert module 70 can be controlled by the vehicle control module 60, directly by the module 30, or in any other suitable manner.

FIG. 2 illustrates a method 110 according to the present teachings for slowing and stopping the subject vehicle 20 in response to detection of an emergency vehicle with emergency lights activated, and/or in response to detection of a school bus with activated stop lights. The method 110 can be performed with the vehicle safety system 10, or with any other suitable system. The method 110 is described herein as being performed by the system 10 for exemplary purposes only.

With initial reference to block 112, the method 110 starts and at block 114 the subject vehicle 20, or any other suitable vehicle, is driven. At block 116, the emergency vehicle/school bus detection module 30 determines whether an emergency vehicle is approaching the subject vehicle 20 from the front in the manner explained above. At block 118, the module 30 determines whether there is an emergency vehicle with emergency lights activated approaching the subject vehicle 20 from behind. At block 120, the module 30 determines whether there is an emergency vehicle with emergency lights activated approaching the path of the subject vehicle 20, such as in the example illustrated in FIG. 4.

If at block 116 the module 30 determines that an emergency vehicle with emergency lights activated is approaching the front of the subject vehicle 20, the method 110 proceeds to block 130, where the module 30 identifies the type of road that the subject vehicle 20 is traveling along. If the road is a highway or has a median, the method 110 returns to block 114, and continues as illustrated in FIG. 2 from block 114. If at block 130 the module 30 determines that the subject vehicle 20 is not traveling on a highway or a road with a median, the method 110 proceeds to block 132.

At block 132, the module 30 or the vehicle control module 60 activates the alert module 70 to issue a warning to the driver of the subject vehicle 20 that the subject vehicle 20 is approaching an emergency vehicle. From block 132, the method 110 proceeds to block 134, where the module 30 identifies which lane the subject vehicle 20 is traveling in when the road has more than one lane. If at block 134 it is determined that the subject vehicle 20 is in the rightmost lane, the method 110 proceeds to block 136 where the module 30 identifies whether or not the road includes a shoulder to the right of the subject vehicle 20. If the road includes a shoulder, at block 138 the module 30 instructs the vehicle control module 60 to steer the vehicle 20 to the shoulder. If at block 134 it is determined that the subject vehicle 20 is not in the right-hand lane (the right-most lane), but in a lane to the left of the rightmost lane, the method 110 proceeds to block 140. At block 140 the module 30 instructs the vehicle control module 60 to steer the subject vehicle 20 to the right side of the current lane that the subject vehicle 20 is traveling in.

From blocks 138 and 140 the method 110 proceeds to block 142. At block 142 the module 30 instructs the vehicle control module 60 to smoothly and gradually slow the subject vehicle 20. From block 142 the method 110 proceeds to block 144, where the module 30 continues to monitor the location of the emergency vehicle with emergency lights activated. If the emergency vehicle has yet to pass the subject vehicle 20, the module 30 will continue to instruct the vehicle control module 60 to reduce the speed of the subject vehicle 20 towards a complete stop. The subject vehicle 20 may not necessarily reach a complete stop if the emergency vehicle passes the subject vehicle 20 before the subject vehicle 20 completely stops. After the emergency vehicle passes the subject vehicle 20, the method 110 proceeds from block 144 to block 146, where the module 30 instructs the vehicle control module 60 to return control of the subject vehicle 20 to the driver. From block 146, the method 110 returns to block 114.

If at block 116 the module 30 detects no emergency vehicle with activated emergency lights approaching from a front of the subject vehicle 20, the method 110 proceeds to block 118. If at block 118 the module 30 detects an emergency vehicle with activated emergency lights approaching the subject vehicle 20 from behind, the method proceeds from block 118 to block 132. From block 132 the method proceeds in the same manner as described above through blocks 134, 136, 138, 140, 142, 144, and 146 to block 114.

If at block 118 the module 30 detects no emergency vehicle with activated emergency lights approaching the subject vehicle 20 from behind, the method 110 proceeds to block 120. If at block 120 the module 30 detects that an emergency vehicle with activated emergency lights is approaching an anticipated travel path of the subject vehicle 20, such as in forward cross-traffic, the method 110 proceeds from block 120 to block 150. At block 150, the module 30 instructs the alert module 70 (either directly or by way of the vehicle control module 60) to warn the driver of the subject vehicle 20 that an emergency vehicle is approaching. The warning can be any suitable visual and/or audible warning. From block 150 the method 110 proceeds to block 142 described above. From block 142 the method 110 proceeds to blocks 144 and 146, and back to block 114.

If at block 120 the module 30 detects no emergency vehicle with activated emergency lights approaching an anticipated path of the subject vehicle 20, the method 110 proceeds to block 122. At block 122 the module 30 detects whether a school bus is stopped ahead of the subject vehicle 20 with stop lights (and in some cases stop sign) activated indicating that the school bus is stopping to pick up or drop off students. If at block 122 the module 30 does not detect a stopped school bus with activated stop lights, the method 110 proceeds to block 146, and ultimately block 114.

If at block 122 the module 30 identifies a stopped school bus with activated stop lights, the method 110 proceeds to block 152. At block 152 the module 30 determines whether or not the school bus is in a lane running opposite to the current lane of the subject vehicle 20, and on a side of a median opposite to the subject vehicle 20. If at block 152 the module 30 determines that the school bus is in an opposing lane on the opposite side of a median from the subject vehicle 20, the method 110 proceeds to block 146 and ultimately returns to block 114. If at block 152 the module 30 determines that the school bus is not in an opposing lane on an opposite side of the median, the method 110 proceeds to block 154.

At block 154, the module 30 commands the alert module 70, either directly or by way of the vehicle control module 60, to issue a suitable warning to the driver of the subject vehicle 20 informing the driver that a school bus with activated stop lights is stopped ahead. From block 154, the method 110 proceeds to block 156, which is the same as block 142. From block 156, the method 110 proceeds to block 158. At block 158, the module 30 detects whether or not the school bus has started to move. Once the module 30 determines that the school bus has started to move, the method 110 proceeds from block 158 to block 146, and ultimately returns to block 114.

The present teachings thus advantageously provide for a system and method for not only detecting the presence of emergency vehicles with activated emergency lights, and school buses with activated stop lights, but also slow a subject vehicle towards, and in some instances ultimately to, a complete stop. The present teachings thus ensure that the driver of the subject vehicle 20 complies with regulations requiring yielding to emergency vehicles and stopping for school buses, and enhances the safety of the driver of the subject vehicle 20 and others.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A system for slowing a subject vehicle in response to detection of an emergency vehicle with activated emergency lights or a school bus with activated stop lights, the system comprising:
    a camera module including at least one camera configured to capture image data;
    a detection module in communication with the camera module to receive image data from the camera module, the detection module configured to at least one of:
        detect location of the emergency vehicle with activated emergency lights relative to the subject vehicle based on image data received from the camera module including images of the activated emergency lights; and
        detect location of the school bus with activated stop lights relative to the subject vehicle based on image data received from the camera module including images of the activated stop lights; and
    a vehicle control module configured to slow the subject vehicle in response to:
        the detection module detecting that the emergency vehicle with activated emergency lights and the subject vehicle are approaching one another; or
        the detection module detecting that subject vehicle is approaching the school bus with activated stop lights.

2. The system of claim 1, the system further comprising the subject vehicle including the detection module and the vehicle control module.

3. The system of claim 1, further comprising a communications module configured to receive route data from at least one of the emergency vehicle and the school bus by vehicle-to-vehicle communication;
    wherein the detection module is configured to detect location of the emergency vehicle with activated emergency lights relative to the subject vehicle based on the route data, or detect location of the school bus with activated stop lights relative to the subject vehicle based on the route data.

4. The system of claim 1, wherein the vehicle control module is configured to activate brakes of the subject vehicle to slow the subject vehicle.

5. The system of claim 4, wherein the vehicle control module is configured to activate the brakes of the subject vehicle to slow the subject vehicle to a complete stop.

6. The system of claim 1, wherein the vehicle control module is configured to move the subject vehicle away from the emergency vehicle when the detection module detects that the emergency vehicle with activated emergency lights and the subject vehicle are approaching one another.

7. The system of claim 6, wherein the vehicle control module is configured to control at least one of a steering system and a braking system of the subject vehicle to move the subject vehicle away from the emergency vehicle.

8. The system of claim 6, wherein the vehicle control module is configured to control at least one of a steering system and a braking system to move the subject vehicle away from the emergency vehicle to a road shoulder or a side of a vehicle lane that the subject vehicle is traveling in.

9. The system of claim 1, wherein the detection module is configured to detect an activated stop sign mounted to the school bus, and the vehicle control module is configured to slow the subject vehicle in response to detection of the activated stop sign.

10. A method for slowing a subject vehicle in response to detection of an emergency vehicle with activated emergency lights, the method comprising:
    detecting the emergency vehicle based on image data input to a detection module from, and captured by a camera of, a camera module;
    detecting, with the detection module for the subject vehicle, the emergency vehicle with activated emergency lights and location of the emergency vehicle relative to the subject vehicle based on image data received from the camera module including images of the activated emergency lights; and
    applying brakes of the subject vehicle by way of a vehicle control module when the detection module detects that the emergency vehicle with activated emergency lights and the subject vehicle are approaching one another.

11. The method of claim 10, further comprising detecting location of the emergency vehicle relative to a secondary vehicle based on route data transmitted by the emergency vehicle and received by the detection module from a communications module for the subject vehicle.

12. The method of claim 10, further comprising steering the subject vehicle to a road shoulder or a side of the subject vehicle's lane of travel when the detection module detects that the emergency vehicle with activated emergency lights and the subject vehicle are approaching one another.

13. The method of claim 10, further comprising applying the brakes to bring the subject vehicle to a complete stop when the detection module detects that the emergency vehicle with activated emergency lights and the subject vehicle are approaching one another.

14. A method for stopping a subject vehicle in response to detection of a school bus with activated stop lights, the method comprising:
   detecting the school bus based on image data input to a detection module from, and captured by a camera of, a camera module;
   detecting, with the detection module for the subject vehicle, the school bus with activated stop lights and location of the school bus relative to the subject vehicle based on image data received from the camera module including images of the activated stop lights; and
   applying brakes of the subject vehicle by way of a vehicle control module to bring the subject vehicle to a complete stop when the detection module detects that the subject vehicle is approaching the school bus with activated stop lights.

15. The method of claim 14, further comprising detecting with the detection module an activated stop sign of the school bus based on camera data input to the detection module from the camera module, and applying the brakes of the subject vehicle by way of the vehicle control module in response to detection of the stop sign.

16. The method of claim 14, further comprising detecting location of the school bus relative to a secondary vehicle based on route data transmitted by the school bus and received by the detection module from a communications module for the subject vehicle.

17. A method for stopping a subject vehicle in response to detection of a secondary vehicle with activated warning lights, the method comprising:
   detecting the secondary vehicle based on image data input to a detection module from, and captured by a camera of, a camera module;
   detecting, with a detection module for the subject vehicle, the secondary vehicle with activated emergency lights, and location of the secondary vehicle relative to the subject vehicle based on image data received from the camera module including images of the activated emergency lights; and
   applying brakes of the subject vehicle by way of a vehicle control module when the detection module detects that the secondary vehicle with activated emergency lights and the subject vehicle are approaching one another.

* * * * *